United States Patent [19]

Burns

[11] 3,729,816

[45] May 1, 1973

[54] METHOD OF FORMING A CIRCUIT

[75] Inventor: John Andrew Burns, New Hope, Pa.

[73] Assignee: Western Electric Company, Incorporated, New York, N.Y.

[22] Filed: Dec. 2, 1971

[21] Appl. No.: 203,997

[52] U.S. Cl. ..........................29/593, 29/407, 29/626

[51] Int. Cl. ..............................................B01j 17/00

[58] Field of Search .....................29/593, 407, 203 B, 29/203 D, 628, 626, 625, 574, 629, 589–591

[56] References Cited

UNITED STATES PATENTS

| | | | |
|---|---|---|---|
| 3,615,949 | 10/1971 | Hicks | 29/625 |
| 3,487,541 | 1/1970 | Boswell | 29/203 B |
| 3,641,661 | 2/1972 | Canning | 29/593 |
| 3,549,782 | 12/1970 | Reifel | 29/625 |
| 3,443,160 | 5/1969 | Salera | 29/626 |
| 3,387,365 | 6/1968 | Stelmak | 29/629 |

*Primary Examiner*—Richard J. Herbst
*Assistant Examiner*—M. J. Keenan
*Attorney*—W. M. Kain et al.

[57] ABSTRACT

An electrical circuit is formed by a process which permits the electrical testing of portions of the circuit during the circuit forming process. One or more temporary crossover members are formed, which may interconnect certain circuit paths, while spanning and not contacting other paths eventually to be interconnected into the circuit. The temporary crossover members are preferably formed, along with any other crossover members and/or electrical components desired, on a carrier member and then transferred onto a dielectric substrate carrying the circuit paths. Electrical testing of the incomplete circuit follows. The circuit is thereafter completed with deformation of the temporary crossover members into electrical contact with the spanned circuit paths and bonding the deformed crossover portions to the spanned paths.

22 Claims, 5 Drawing Figures

INVENTOR
J. A. BURNS
By [signature]
ATTORNEY

METHOD OF FORMING A CIRCUIT

BACKGROUND OF THE INVENTION

This invention relates to a method of forming an electrical circuit and, more particularly, to a method of forming an electrical circuit wherein electrical testing may be performed on portions of the circuit in the course of forming the circuit.

In the art of manufacturing certain electrical devices, such as thin film circuits, it may be necessary that one or more electrical tests be performed on portions of an incomplete circuit in order to determine whether any faulty interconnection or component is present. For example, it may be required that relatively expensive electrical components, such as integrated circuits, be bonded to circuit paths on thin film circuit substrates. Clearly, the electric integrity of the circuit paths should advantageously be tested prior to any commitment of such components inherent in the performance of bonding operations.

Additionally, electrical testing of circuit paths and/or components only upon the completion of an electrical device can become quite difficult in the case of complex circuit patterns. Short circuit or open circuit indications may not provide sufficient information for localizing faults, due to redundancies which may be inherent in a completed circuit pattern. Visual inspection of the circuitry must then be employed to find each fault. Testing at one or more intermediate stages in circuit manufacture can avoid the need for such visual inspection.

The assembly of a number of electrical components onto a thin film circuit generally involves a succession of bonding operations. It would, therefore, be quite advantageous to provide that one or more of the stages in circuit manufacture incorporate operations which allow necessary testing of the circuitry in an incomplete form, yet facilitate the interconnection of circuit elements in subsequent stages of manufacture.

Clearly, in the manufacture of complex electric circuitry, a simple, reliable method of assembly, adapted to permit electrical testing in one or more incomplete stages of a circuit and, thereafter, permanent completion of the circuit, would be most desirable.

SUMMARY OF THE INVENTION

An object of the invention resides in new and improved methods for forming an electrical circuit, particularly where electrical testing is to be performed on portions of the circuit during the circuit forming process.

The invention contemplates the forming of an incomplete electrical circuit by the use of one or more temporary crossover members, which may electrically interconnect selected electrically conductive paths and/or electrical components of the circuit, while one or more additional circuit elements are temporarily spanned and not contacted by the crossover members. Electrical testing of the incomplete circuit follows. Thereafter, the circuit is completed by the simple expedient of deforming the crossover members into electrical contact with the spanned circuit elements.

The temporary crossover members may be formed on a common carrier member and transferred and bonded simultaneously onto a circuit undergoing manufacture. Preferably, the temporary crossover members are formed on the carrier member and then transferred and bonded onto the circuit simultaneously with other crossover members and/or electrical components which are to form permanent elements of the circuitry. Testing may include the performance of tests upon one or more of the additional, newly formed crossover members and electrical components. Deformation and bonding of the temporary crossover members into permanent electrical contact with spanned circuit elements follows in a subsequent stage of manufacture of the desired circuit.

DETAILED DESCRIPTION

Figures 1, 2:
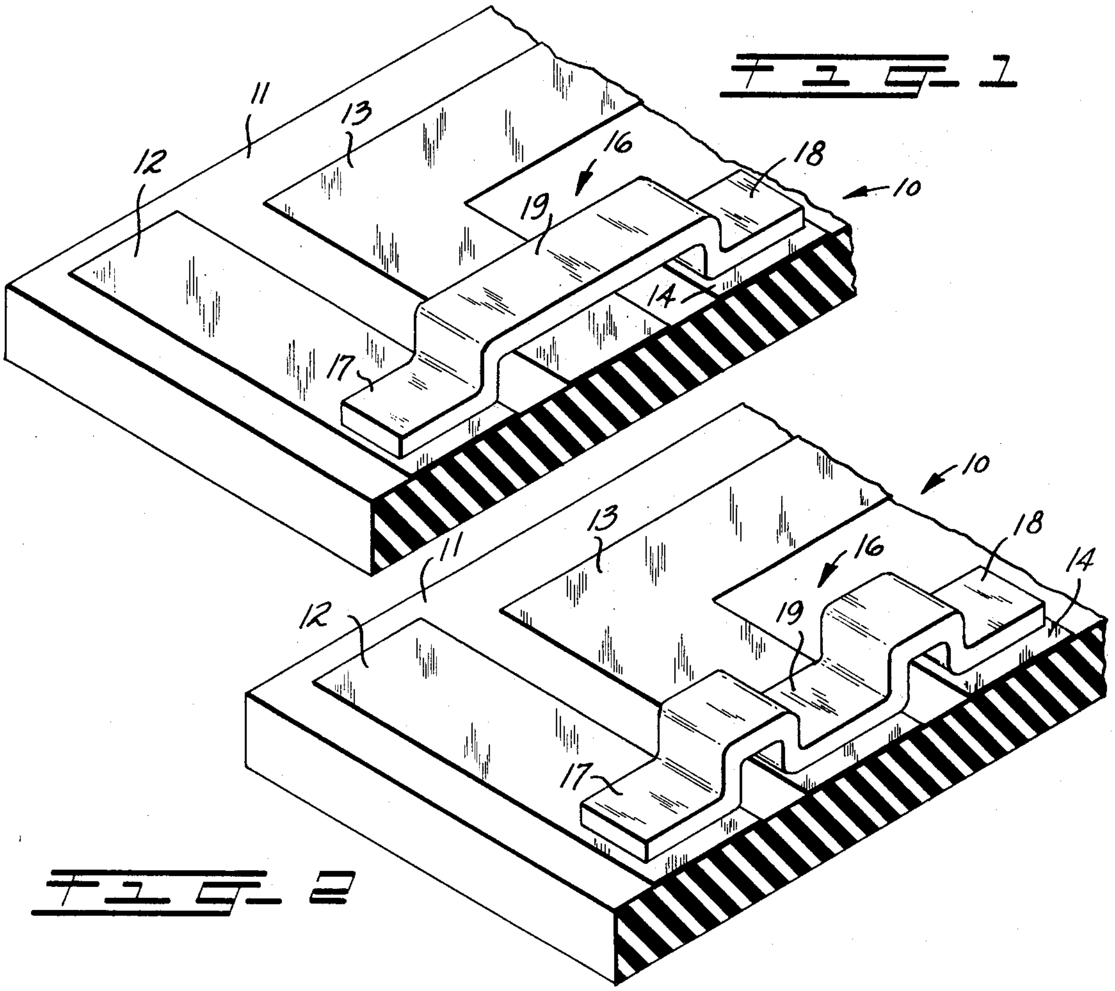
FIGS. 1 and 2 are isometric views showing two stages in the formation a first electrical device in accordance with the principles of the invention.

Referring to FIG. 1 of the drawing, a thin film device 10 includes a dielectric substrate 11 and three electrically conductive elements 12, 13 and 14 formed on the substrate. The three elements may be three electrically conductive circuit paths. The paths are initially electrically isolated from one another. It is desired that electrical testing be performed on the circuitry with the paths 12 and 14 electrically coupled and the path 13 electrically isolated from both of the paths 12 and 14. It is desired, thereafter, that all three paths be coupled electrically.

An electrically conductive crossover member 16 is formed on the device 10 in such manner as to provide the initially desired testing condition of the circuitry. The ends 17 and 18 of the crossover member 16 are coupled electrically to the paths 12 and 14, respectively. A central section 19 of the crossover member 16 spans the path 13 without contacting the spanned path.

Figure 3:
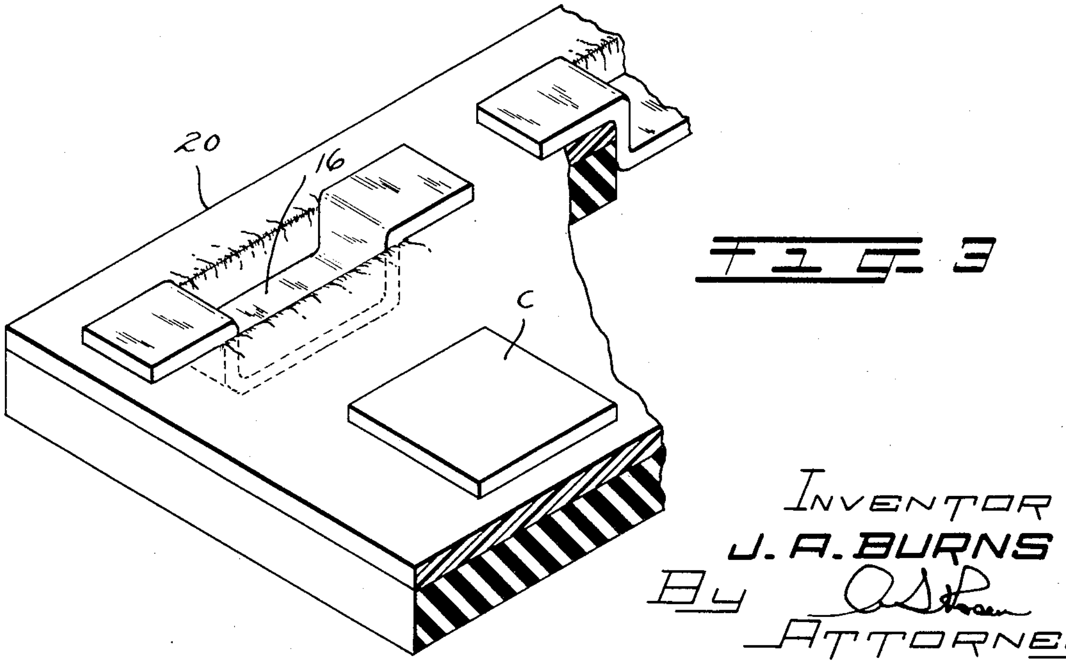
FIG. 3 is an isometric view of a carrier member which may be used in forming the structure shown in FIG. 1.

The crossover member 16 may advantageously be formed on the device 10 by the method taught in a patent application filed on Oct. 6, 1971 by J. A. Burns and A. Coucoulas, Serial No. 186,833, constituting a continuation-in-part of J. A. Burns and A. Coucoulas patent application Ser. No. 864,856, filed Oct. 8, 1969, now abandoned. Briefly, the method of forming crossover members taught by the designated application involves the use of a carrier member 20 (FIG. 3) upon which one or more crossover members are fabricated. The crossover members are built up by metal-coat, photoresist-coat, expose and etch techniques, in conventional manner, or by other techniques, followed by mechanism shaping operations. The crossover members are then transferred and bonded to aligned slits on a substrate, such as dielectric substrate 11 (FIG. 1), by application of pressure and thermal energy to the members at the bonding sites, for example, through the inverted carrier member 20. Alternatively, heat may be applied through the dielectric substrate 11. The crossover member 16 may be one of a number of crossover members so fabricated and so bonded onto the substrate 11 of the device 10 simultaneously. Any other electrical component or components, such as an integrated circuit chip or other component C shown schematically in FIG. 3, also formed or mounted on the carrier member 20, may be bonded to the device 10 simultaneously with the crossover member 16. The additional component C or components may be maintained electrically isolated from the crossover member 16, may be electrically coupled to the path 13, may be electrically coupled to the crossover member 16 by means of either or both of the paths 12 and 14, may be formed integrally with the crossover member 16 or any other crossover member on the carrier member 20 and then transferred to the device 10 with the crossover member, and/or may be electrically coupled to any other circuit path or paths (not shown) on the dielectric substrate 11, as may be required for the particular device 10 being formed. The simultaneous emplacement and bonding of all such circuit elements, including the temporary crossover member 16, through the use of the common carrier member 20, avoids any need for a separate process step for forming the crossover member 16 on the dielectric substrate 11.

The device 10 is now in condition, as shown in FIG. 1, for the desired testing to take place. The path 13 is isolated electrically from both of the paths 12 and 14, which last-mentioned paths have been electrically coupled by the crossover member 16. Testing may include testing of one or more of the electrical components, or other crossover members, formed onto the circuit simultaneously with the crossover member 16, and/or testing of their respective interconnections with any of the paths 12, 13 and 14.

After the testing has been completed, the central section 19 of the crossover member is mechanically deformed and bonded to the path 13. Bonding may take place through the application of standard thermocompression or other conventional bonding techniques. Deforming and bonding energy may be introduced into the central section 19 of the crossover member 16, and thereupon into the interface between the central section 19 and the path 13, for example, through a portion of the carrier member 20 which may still be retained by the crossover member. The structure illustrated in FIG. 2 is, thus, formed. This is the final condition desired for the device 10, the paths 12, 13 and 14 being electrically coupled by the crossover member 16 through interconnections at portions 17, 19 and 18 of the crossover member, respectively. The "-crossover" function of the member 16, of course, ceases upon the bonding of the central section 19 to the path 13, the member 16 thereafter serving the same function as would any fully planar conductive member in interconnecting the paths 12, 13 and 14.

The structure of FIGS. 1 and 2 may also be employed under slightly different circumstances. Only two electrically conductive elements, the circuit paths 12 and 13, may initially be of interest. It may be desired to test the circuitry with the paths 12 and 13 electrically isolated from one another, after which the paths are to be electrically coupled. It may also be desired that one or more other crossover members and/or electrical components be bonded to the dielectric substrate 11 prior to the testing operation.

A third element 14 is also present on the dielectric substrate 11. The third element 14, which need not constitute a portion of a circuit path, nor need it even be electrically conductive, is initially formed on the substrate, for example, simultaneously with the forming of the paths 12 and 13. A temporary crossover member 16 is thereafter bonded to the path 12 and the third element 14, spanning the path 13, as shown in FIG. 1. The third element 14, obviously, merely serves the purpose of receiving the portion 18 of the crossover member 16, and may, thus, be any conventional land area element. The crossover member 16 is bonded onto the device 10 simultaneously with the other crossover members and/or components to be bonded to the dielectric substrate 11, in the manner discussed previously, prior to the testing of the circuitry in the form of FIG. 1. After testing, the central section 19 of the temporary crossover member is readily deformed and bonded to the path 13 (FIG. 2), for example, by standard thermocompression and/or compliant bonding techniques.

Figure 4:
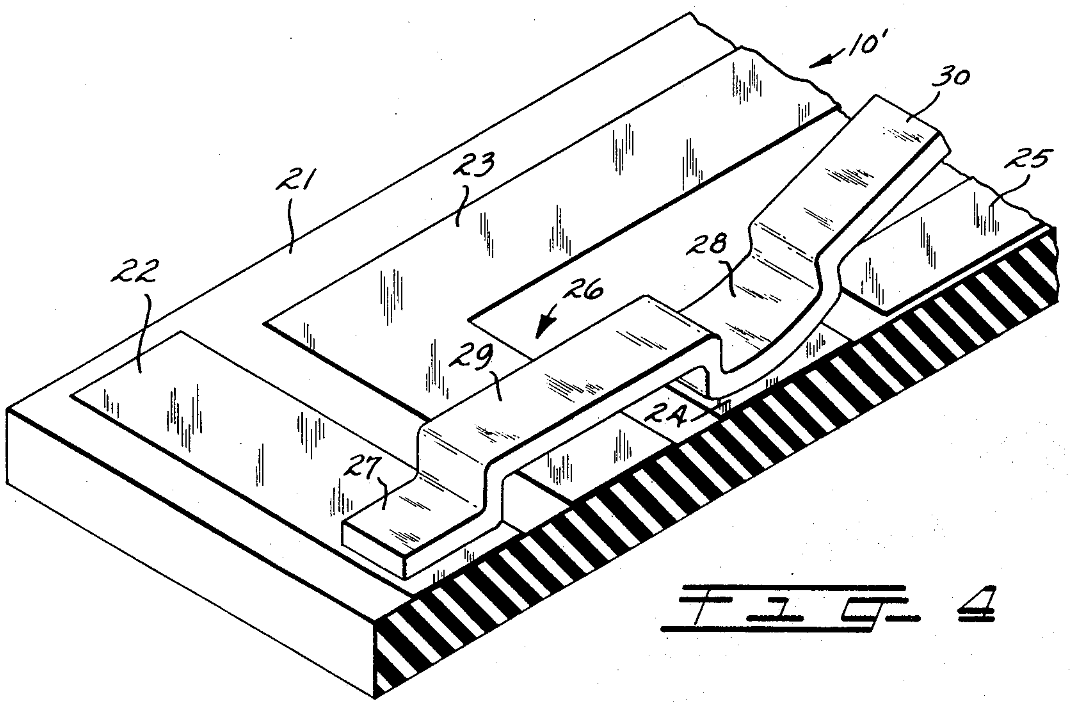
FIGS. 4 and 5 are isometric views showing two stages in the formation of a second electrical device in accordance with the principles of the invention.

Referring next to FIG. 4 of the drawing, a thin film device 10′ includes a dielectric substrate 21 and three electrically conductive elements 22, 23 and 24, which may be circuit paths corresponding to the paths 12 and 13 and the path or land area 14 of the device 10 of FIGS. 1 and 2. The substrate 21, which may simply be another section of the substrate 11 (FIGS. 1 and 2) also carries a fourth electrically conductive element 25, which may be an additional circuit path. The four paths are initially electrically isolated from one another. It is desired that electrical testing of the circuitry take place with paths 22 and 24 electrically coupled and paths 23 and 25 electrically isolated from paths 22 and 24, and from each other. It is desired, thereafter, that paths 22, 24 and 25 be electrically coupled, with path 23 electrically isolated from paths 22, 24 and 25. Alternatively, once again, one of the elements 22, 23, 24, 25, such as element 24, may constitute a crossover-receiving or land area element, formed on the dielectric substrate 11 solely to permit the bonding of a temporary crossover to the dielectric substrate, if necessary to such bonding, in which case the element need not be electrically conductive.

An electrically conductive crossover member 26 is formed on the device 10′, in similar manner to the formation of the crossover member 16 on the device 10 of FIG. 1, in order to provide the initially desired testing condition of the circuitry. Two interconnecting sections 27 and 28 of the crossover member 26 are coupled electrically to the paths 22 and 24, respectively. Additional sections 29 and 30 of the crossover member 25 span the paths 23 and 25, respectively, without contacting the spanned paths. Other crossover members and/or electrical components are preferably formed onto the dielectric substrate 21 simultaneously with the forming of the crossover member 26. The desired testing operations may now occur.

Figure 5:
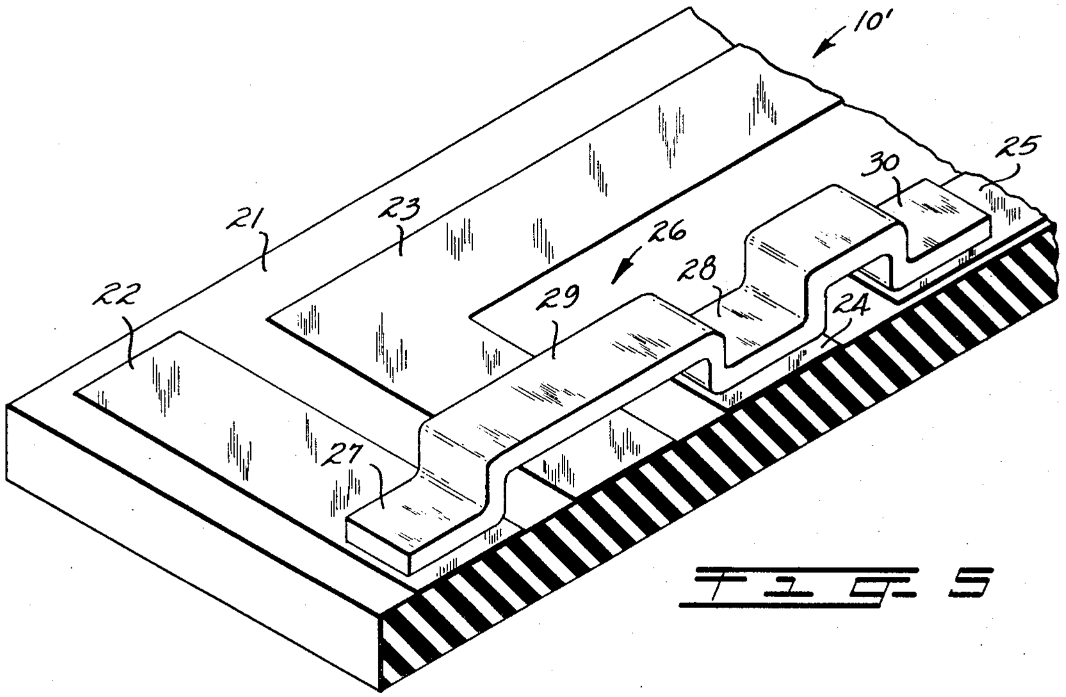

After completion of the testing phase, the spanning section 30 of the crossover member 26 is deformed and bonded to the path 25 by any suitable technique, as discussed previously concerning the deforming and bonding of the central section 19 (FIG. 2) of the crossover member 16 to the path 13 of the device 10. The bonding operation provides the permanent structure shown in FIG. 5. This is the desired final condition of the device 10′, with the paths 22, 24 and 25 electrically coupled and the path 23, spanned by section 29 of the crossover member 26, electrically isolated from the paths 22, 24 and 25. The "crossover" function of the member 26 is preserved, in that section 29 still does not interconnect with the spanned path 23.

It is to be understood that the methods described above are simply illustrative of certain embodiments of the invention. In other embodiments, any number of electrically conductive elements may initially be electrically isolated from one another; any lesser number of the elements, including zero, may be interconnected, prior to electrical testing, other elements being spanned and not electrically interconnected by temporary crossover members; and any number of the spanned elements not electrically interconnected prior to testing may be interconnected thereafter, all according to the techniques disclosed. Any number of additional crossover members and/or other electrical components may be formed on a dielectric substrate simultaneously with the forming of the crossover members which are to be deformed after testing. Moreover, any number of intermediate interconnecting and testing steps may occur, such that plural testing operations take place at various stages in the manufacture of an electrical device, in the manner taught by this disclosure. Many other modifications may be made in accordance with the principles of the invention.

What is claimed is:

1. A method of forming an electrical circuit for interconnecting a plurality of circuit elements, the circuit having certain desired electrical characteristics, comprising the steps of:

coupling an electrically conductive member to at least one of the circuit elements with the electrically conductive member spanning, but not contacting, at least one other of the circuit elements to form an incomplete circuit; then testing the incomplete circuit to ascertain that the desired electrical characteristics are present; and then coupling the electrically conductive member to at least one spanned circuit element.

2. In a method of testing and electrically coupling a plurality of electrically conductive elements:

locating an electrically conductive coupling member in electrical contact with first and second elements, at least one of which is electrically conductive, while spanning an electrically conductive third element and not contacting said third element to provide an incomplete circuit, then electrically testing the incomplete circuit, and then contacting the electrically conductive coupling member with the electrically conductive third element.

3. In the method of claim 2:

said locating step comprising locating the electrically conductive coupling member to span an electrically conductive fourth element intermediate two of the other elements and not contact the fourth element, and said contacting step comprising contacting the electrically conductive coupling member with the third element while not contacting the electrically conductive coupling member with the spanned fourth element such that the electrically conductive coupling member acts as a crossover member with respect to the fourth element.

4. In the method of claim 2:

said locating step comprising locating the electrically conductive coupling member such that a free end portion of the electrically conductive coupling member initially spans the third element without contacting the third element, and said contacting step comprising contacting said free end portion of the electrically conductive coupling member with the third element.

5. In the method of claim 2, the preliminary step of:

forming said first, second and third elements on a dielectric substrate with one of said first and second elements positioned to receive a portion of said electrically conductive coupling member and having no substantial transversely extending portion for interconnection with any other electrically conductive element.

6. In a method of testing and electrically coupling a plurality of electrically conductive elements, the steps of:

forming an electrically conductive crossover member in contact with first and second elements, at least one of which is electrically conductive, while spanning an electrically conductive third element and not contacting the third element, then electrically testing at least one of the three elements, and then deforming the crossover member into electrical contact with the electrically conductive third element so as to couple the third element with the first and second elements.

7. In the method of claim 6, said deforming step comprising:

bonding to the third element a spanning section of the crossover member overlying the third element.

8. In the method of claim 6, said third element being located intermediate said first and second elements.

9. In the method of claim 6, said second element being located intermediate said first and third elements.

10. In the method of claim 6, the preliminary step of:

forming said first, second and third elements on a dielectric substrate with one of said first and second elements positioned to receive a portion of said crossover member and having no substantial transversely extending portion for interconnection with any other electrically conductive element.

11. In a method of forming an electrical device which includes a plurality of electrically conductive paths on a dielectric substrate, the steps of:

forming an electrically conductive crossover member in electrical contact with at least one of the electrically conductive paths on the dielectric substrate while spanning, without contacting, an additional electrically conductive path; then electrically testing at least one of the electrically conductive paths; and then deforming the crossover member into electrical contact with said additional electrically conductive path.

12. In the method of claim 11:

forming a second crossover member in electrical contact with at least one electrically conductive path on the dielectric substrate while spanning, without contacting, another electrically conductive path substantially simultaneously with the forming of the first-mentioned crossover member on the dielectric substrate.

13. In the method of claim 12, both of said forming steps comprising:

forming each respective crossover member on a common carrier member, and then transferring the crossover members substantially simultaneously onto the dielectric substrate from the carrier member.

14. In the method of claim 12:

deforming the second crossover member into contact with said other electrically conductive path simultaneously with the step of deforming the first-mentioned crossover member into contact with said additional electrically conductive path.

15. In the method of claim 12, said deforming step comprising:

deforming the first-mentioned crossover member into contact with said additional electrically conductive path while retaining the second crossover member in undeformed condition so as to continue to perform a crossover function with respect to said other electrically conductive path.

16. In the method of claim 12:

forming at least one electrical component other than a crossover member in electrical contact with at least one electrically conductive path on the dielectric substrate substantially simultaneously with the step of forming the first-mentioned crossover member on the dielectric substrate.

17. In the method of claim 16, each of said forming steps comprising:

forming each respective crossover member and electrical component on a common carrier member, and then transferring all the crossover members and electrical components substantially simultaneously onto the dielectric substrate from the carrier member.

18. In the method of claim 16, said testing step comprising:

electrically testing at least one electrical component and/or crossover member initially formed on the dielectric substrate with the first-mentioned crossover member.

19. In the method of claim 11:

forming at least one electrical component other than a crossover member in electrical contact with at least one electrically conductive path on the dielectric substrate substantially simultaneously with the step of forming the crossover member on the dielectric substrate.

20. In the method of claim 19, both of said forming steps comprising:

forming each respective crossover member and electrical component on a common carrier member, and transferring the crossover member and all electrical components substantially simultaneously onto the dielectric substrate from the carrier member.

21. In the method of claim 19, said testing step comprising:

electrically testing at least one electrical component initially formed on the dielectric substrate with the crossover member.

22. In the method of claim 11:

the preliminary step of forming said plurality of electrically conductive paths on said dielectric substrate while simultaneously forming on the dielectric substrate a localized land area having no substantial transversely extending portion, said step of forming the electrically conductive crossover member comprising bonding a portion of the crossover member to said localized land area on the dielectric substrate.

* * * * *